United States Patent [19]

Sawhill

[11] 4,081,555

[45] Mar. 28, 1978

[54] PRESERVATION OF WHEY

[75] Inventor: James W. Sawhill, Canoga Park, Calif.

[73] Assignee: Roger Marten, Mondovi, Wis. ; a part interest

[21] Appl. No.: 694,460

[22] Filed: Jun. 9, 1976

[51] Int. Cl.$^2$ .................. A23C 21/00; A23K 3/00
[52] U.S. Cl. .................. 426/2; 426/335; 426/532; 426/583; 426/807
[58] Field of Search .............. 426/2, 478, 55, 56, 426/321, 41, 330.2, 335, 532, 580, 583, 490, 491, 658, 334, 805, 807

[56] References Cited

U.S. PATENT DOCUMENTS

| | | |
|---|---|---|
| 2,708,166 | 5/1955 | Tumerman et al. ............. 426/478 X |
| 3,232,768 | 2/1966 | Van Wieren et al. ........... 426/335 X |
| 3,840,670 | 10/1974 | Holt .................................. 426/583 X |
| 3,895,117 | 7/1975 | Backlund ......................... 426/658 X |

OTHER PUBLICATIONS

Morrison "Feeds and Feeding" Morrison Publishing Co., 22nd Edition, 1957, p. 515.

*Primary Examiner*—R. B. Penland
*Attorney, Agent, or Firm*—Merchant, Gould, Smith, Edell, Welter & Schmidt

[57] ABSTRACT

Useful whey concentrates can be stabilized against putrefying action using a combination of downward pH adjustment (to 2.5–4.2) and a preservative agent. The best results are obtained with benzoates and/or sorbates as the preservative agent.

15 Claims, No Drawings

PRESERVATION OF WHEY

FIELD OF THE INVENTION

This invention relates to the preparation of useful products from whey, e.g. whey concentrates useful in ruminant feed. An aspect of this invention relates to a method for stabilizing whey, i.e. treating a whey concentrate to make it resistant to the action of putrefying bacteria and resistant to flocculation or separation of suspended or dispersed, substantially water insoluble phases. Still another aspect of this invention relates to liquid ruminant feeds containing whey solids.

DESCRIPTION OF THE PRIOR ART

In the dairy industry, it is common to treat liquid dairy products such as milk or cream with microorganism-containing materials which convert the liquid to a solid or semi-solid such as cottage cheese. A liquid material called whey is a by-product of such conversions. Raw whey rarely contains more than about 6 or 7% by weight of solids, but these whey solids have nutrient value. Among the typical whey solids are traces of fat and significant amounts of protein and water soluble salts, milk sugars, and lactic acid. Since the whey solids are in a very low concentration, drying or concentration of the whey is normally required if the whey is to be used for ruminant feed or the like. Unpasteurized whey concentrates are difficult to preserve, due to undesirable bacterial action. Whey solids tend to be hygroscopic, which makes spray drying (the commonest form of drying) difficult and rather costly. Any form of concentration or drying must be gentle enough to avoid "browning" or Maillard reactions (non-enzymatic degradation).

If whey concentrates could be preserved against the action of putrefying bacteria without pasteurization, an inexpensive and nutritious foodstuff suitable for addition to animal feeds or the like would be obtained in enormous quantities. For example, a whey concentrate at only 30 to 60% solids would typically be as nutritious or nearly as nutritious as molasses, one of the widely used feedstuffs for ruminants. Yet, from a raw material cost standpoint, whey could be one of the least expensive foodstuffs available today.

Since almost half the raw whey is presently being spray dried, and utilization of whey continues to be a complicated and expensive proposition, a large amount of whey is disposed of more simply by dumping it on land or into natural bodies of water or sewer systems. Due to the polluting effects of on-land and sewer disposal, it is becoming imperative to find simpler and more inexpensive ways for utilizing (as opposed to disposing of) raw whey concentrates.

The putrefying microorganisms which spoil whey and make it both unpalatable and toxic to animals are most active at a pH above about 6.5. In the range of about 4.3–6.5, fermenting organisms such as *lactobacillus bulgaricus* and *streptococcus thermophilus* are active. These microscopic flora convert carbohydrates into lactic acid. Lactic acid has a $pk_a$ of 3.86 and can drop the pH of whey to unpalatable levels. Almost all the action of microorganisms is inhibited at a pH below 4.3 (e.g. 3.0–4.2); however, acidic materials may be unpalatable and may create special handling requirements (e.g. stainless steel equipment). Furthermore, whey can spoil even at a pH as low as about 3.

A number of bacteriostatic agents have been experimented with for the purpose of stabilizing whey. Generally, these agents have been discarded because they are not sufficiently effective or are toxic to animals (e.g. mammals such as pets and farm animals).

For a typical disclosure of a process for utilizing whey as a feed, see Arnott et al, *J. Dairy Sci.* 41:931 (1958) and U.S. Pat. No. 2,904,437 (Czarnetzky), issued Sept. 15, 1959. See also U.S. Pat. No. 2,809,113 (Stimpson et al), issued Oct. 8, 1957.

SUMMARY OF THE INVENTION

It has now been found that a surprising degree of resistance to putrefaction can be imparted to whey concentrates through a combination of a pH manipulation and the introduction of a bacteriostatic or preservative agent into the water phase of the whey. Phosphoric acid (e.g. orthophosphoric acid) is the acid of choice for the pH adjustment, and the preferred preservative or bacteriostatic agents are organic carboxylic acids or their substantially non-toxic salts. The preferred preservatives have the formula:

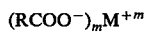

$$(RCOO^-)_m M^{+m}$$

wherein
R is selected from the group consisting of aromatic (e.g. phenyl) and unsaturated aliphatic (e.g. sorbyl, which in Geneva nomenclature would be hexadienyl);
$M^{+m}$ is a biologically acceptable action (e.g. hydrogen, an alkali metal, calcium, magnesium, ammonium, and the like); and
m is the valence of M (e.g. one or two).

Optimum results have been obtained with benzoic acid and its alkali metal salts, up to 50 or 70% of which can be substituted for by using sorbic acid or its alkali metal salts. The total replacement of benzoic acid or benzoate with sorbate is ordinarily not preferred, since there can be some mold growth even in the presence of a preservative consisting entirely of sorbic acid or sorbate.

For those animals which can tolerate a pH as low as 2.5, pH adjustments to this level can be used. However, since most animals prefer foodstuffs with a pH of at least 3.0, the pH adjustment is preferably kept within the range of 3.0–4.2. The risk of fermentation action becomes very great at a pH above 4.2, and, for most purposes, a pH within the range of 3.8–4.0 is well tolerated by the animals and is unusually effective when used in combination with the aforementioned preservative agents.

In stabilizing a whey composition according to this invention, it is ordinarily convenient to concentrate the whey to the desired solids content, then adjust the pH of the water phase, and finally add the preservative agent in a quantity typically ranging from 0.01 to 5% by weight.

DETAILED DESCRIPTION

As mentioned previously, raw whey typically contains not over about 7% by weight of solids, and this is generally true for both "acid" and "sweet" whey. In typical examples of raw whey (not de-lactosed or de-mineralized), about 65 to 88% by weight can be milk sugars (e.g. lactose), about 1 to 17% can be proteins, about 0.5 to 2% by weight can be fat, and about 0.1 to 12% by weight can be lactic acid. Because of the high lactose content, it is virtually impossible to totally eliminate the water of hydration or other moisture in "dried" whey. Ordinarily, at least 2% of a totally dried whey will comprise water in some form. In any process for concentrating whey, it can be relatively easy to drive off 30 weight-% or more of the water, but as the solids content approaches 60 or 65% (i.e. as the water content approaches 40 or 35 weight-%), the risk of gel formation due to lactose crystallization becomes unreasonably high. Fortunately, energy and time can be saved by concentrating the whey to considerably less than 65 weight-% solids (e.g. not over 60 weight-% or, preferably, not over 50 weight-%). At such solids content levels, whey is already a more nutritious foodstuff than molasses and other commonly used ingredients or feeds. Perhaps the only major drawback of whey concentrate as a foodstuff (other than its tendency to spoil) is its low protein content (in the case of non-ruminants) or, in the case of ruminants, its low apparent crude protein content (ACPC). Several techniques are known for increasing both true protein content and ACPC. For example, meat solubles can be added to the foodstuff. Since ruminants have the ability to utilize simple nitrogen-containing compounds such as urea, it is also well known to add such sources of nitrogen. However, in the practice of this invention, it is preferable to avoid the addition of basic nitrogen compounds which would detract from the benefits of the pH adjustment.

Thus, the whey concentrates of this invention can be combined with fats, carbohydrates, proteins, vitamins, minerals, and other nutrients in conventional ways, so long as the pH is maintained in the correct range and the efficacy of the preservative agents is not interfered with. If significant amounts of fats or other triglycerides are added, it can be desirable to include emulsifiers to stabilize any water-in-oil phase relationships which may result. Of course, even normal whey solids include materials which are not, strictly speaking, soluble in water. However, these materials are readily dispersed in water, and it is only when relatively large (e.g. larger than colloidal) particles or fat globules are contemplated that emulsifiers need be considered for use in whey products of this invention.

The whey used in this invention can be in any suitable form including raw whey, so-called delactosed whey (which still may contain significant amounts of lactose), demineralized whey, and even redissolved or redispersed spray-dried whey. The use of spray-dried whey is not preferred, due to the added drying cost, but the present invention is nonetheless useful for stabilizing a liquid product made from the spray-dried whey solids. Raw whey can be concentrated and then stabilized according to this invention.

In any of the aqueous liquid whey products of this invention, solids are uniformly distributed throughout the liquid whey concentrate. By "uniformly distributed" is meant dissolved, dispersed (as in the case of a colloidal dispersion) or emulsified. If the whey concentrate is combined with a second feed material which has strong thickening of thixotropy-inducing properties, the stability of emulsions can be less important, since the increased viscosity will help to maintain uniform distribution of suspensoids, fat globules, emulsoids, and the like.

THE PUTREFACTION-INHIBITING INGREDIENTS

As mentioned previously, a key concept of this invention involves the effective combination of a preservative agent and a downwardly adjusted pH. The preservative agents used in this invention are substantially non-toxic carboxylic acids or substantially non-toxic salts of these acids. Aromatic carboxylic acids (e.g. benzoic acid) are preferred; solid, unsaturated, aliphatic carboxylic acids such as sorbic acid (2,4-hexadienoic acid) can also be used, but are preferably used in combination with benzoic acid. For example, 50% or even 75% by weight of the benzoic acid can be replaced with sorbic acid. For purposes of improved water solubility, sodium benzoate and/or sodium sorbate can be used; the downward pH adjustment insures that a sufficient amount of the benzoate or sorbate will be in the free acid (-COOH) form. For example, at a pH lower than of 4.0, the benzoate/benzoic acid level can be below 0.5% by weight.

The preservative agent, whether in salt or acid form, should be "substantially non-toxic." By "substantially non-toxic" is meant an oral $LD_{50}$ in at least one, preferably at least two species of mammals (e.g. rats and dogs) which is not less than about 1000 mg per kg of body weight. Thus, for a young calf weighing 50–250 kg, the $LD_{50}$ preferably exceeds 50 to 250 grams, which is ordinarily at least about one to three orders of magnitude greater than the total daily dose received by a 50–250 kg animal on a normal ration comprising whey alone or in a mixture with other feedstuffs. For example, the ration would not normally contain as much as 5% by weight or even 2.5% by weight of preservative agent, based on the weight of the total solids in the whey concentrate. As noted previously, good results can be achieved with less than 0.5% by weight — also based on total solids weight. To be effective, at least 0.01% by weight (preferably at least 0.05% by weight) of preservative agent should be used, on this same total solids weight basis. Under optimum conditions, less than 0.3% by weight (on the same basis) can be used. The oral $LD_{50}$ for sorbic acid in rats is greater than 7 grams (7000 mg) per kilogram of body weight. The oral $LD_{50}$ for sodium benzoate exceeds 4000 mg/kg in rats and is about 2000 mg/kg in dogs. Even allowing for the high metabolic rate of rats, these enormous $LD_{50}$ values indicate substantial non-toxicity in mammals generally including farm animals and domestic pets.

The preferred acid for the pH adjustment is phosphoric acid, e.g. orthophosphoric acid, as $H_3PO_4$ or its monobasic or dibasic salts such as $Na_2HPO_4$ and $NaH_2PO_4$. The equilibria between these various salts and $H_3PO_4$ provide a very useful buffering action, whereby the pH can be maintained with some stability in the 3.8–4.0 range. The total operative pH, as indicated previously, ranges from 2.5 to 4.2. However, few animals will tolerate feeds with a pH in the 2.5–3.0 range. The 4.2 upper limit of the pH range is based upon the ability to inhibit organisms such as *L. bulgaricus* and *S. thermophilus*.

A significant advantage of phosphoric acid is that it contributes a phosphorous source. Furthermore, the self-buffered feature described previously causes the buffered pH to fall almost exactly in the middle of the optimum 3.0–4.2 range. The benzoate level can be lowered considerably, since the pH of a 0.01 normal solution of benzoic acid is about 3.0.

Other inorganic acids can be used in place of, or in addition to, phosphoric acid. Sulfuric and hydrochloric acids are effective and, if anything, even more readily available than phosphoric acid. Sulfuric acid can also serve as a useful source of sulfur to ruminants. Unfortunately, however, these inorganic acids lack the self-buffering action of phosphoric acid.

Substantially non-toxic organic acids with sufficient water solubility and a low $pK_a$ (e.g. below 5) can be used. For example, lower alkanoic acids (particularly acetic, propionic, and butyric) are water soluble and can serve as energy sources for ruminants. Acetic acid meets the non-toxicity requirements of this invention with a comfortable margin to spare. However, these organic acids, even in the cheapest feed grades, are not preferred for reasons of economics; furthermore, they lack the pK characteristics of $H_3PO_4$ (2.12 for $K_1$, 7.21 for $K_2$, and 12.32 for $K_3$).

Whey concentrates containing, for example, 30–60% by weight of solids can be stabilized by the technique of this invention, such that no significant putrefaction occurs at normal ambient temperatures (20°–25° C.) for periods of at least one month, in many cases much longer than a month.

The liquid, preserved whey concentrates of this invention can be fed, as is or in combinations with other feeds, to a variety of farm animals, including calves, hogs, and chickens, and to various domestic pets, including dogs, cats, and rodents. In young mammals, these whey concentrates can be particularly useful as milk replacers. The age of ruminants (e.g. cattle and sheep) is of importance in formulating feeds from whey concentrates containing the preservatives of this invention. For milk fed calves (i.e. calves less than about 1 month old), the liquid whey can be used as a milk replacer with added protein and/or fat and 50% or less dilution with preservative-free feeds (e.g. molasses or other liquid, carbohydrate-containing feeds). Since the calf rumen is still more or less underdeveloped, and the calf's digestive system behaves much like a simple gastrointestinal tract, further dilution can ordinarily be avoided. When the calf is ready for a starter feed, additional dilution (e.g. 50–90% weight-%) can be used to protect useful microorganisms in the rumen. In adult cattle, the dilution level can be increased still further, if necessary.

The principle and practice of this invention is illustrated in the following non-limiting examples.

EXAMPLE 1

In this Example, redissolved spray-dried whey was used to provide a bacterial colony in an initially stable preparation. The resulting solution or dispersion was considered functionally equivalent to an aqueous liquid whey concentrate.

420 Grams of spray dried whey was dissolved in 580 mls of water. A small sample (25 ml) was removed and placed on stability at 23° C. (Sample A). The pH was adjusted to 3.8 with 75% phosphoric acid. Another 25 ml sample was removed and placed on stability at 23° C. (Sample B). 10 Grams of sodium benzoate was added to the batch and stirred until dissolved. The preserved whey was split into five parts. The first and second (Samples No. 1 and No. 2) were placed on long-term stability by placing them in the trunk of a car where the temperatures fluctuated between −10° C. to 50° C. The third (Sample No. 3) was placed in a 37° C. incubator. The fourth (Sample No. 4) was stored ambient (23° C.) and the fifth (Sample No. 5) was placed in a 5° C. refrigerator. Results are shown in Table I.

TABLE I

| | PUTREFACTION (BACTERIOLOGICAL) DATA | | | | | |
|---|---|---|---|---|---|---|
| Sample | Zero Time | 1 Week | 2 Weeks | 3 Weeks | 4 Weeks | 5 Weeks |
| A | 125,000 | Spoiled | — | — | — | — |
| B | | TNC | Spoiled | — | — | — |
| 3 | | 1000 | 1000 | 1000 | 1000 | 1000 |
| 4 | | 1000 | 1000 | 1000 | 1000 | 1000 |
| 5 | | 1000 | 1000 | 1000 | 1000 | 1000 |

Samples No. 1 and No. 2 are not listed in the Table; they showed no evidence of spoiling over a period of even more than five weeks. All samples were subjected to repeated re-innoculations by taking no care in opening the sample containers and in making transfers for bacteria counts. The results indicated a wide temperature range stability and that this preservation system is bacteriocidal.

EXAMPLE 2

A second series of experiments were performed to see if the bacteriocidal qualities would hold over a varied moisture concentration range. Also would these bacteriocidal properties hold if other ingredients were added to the whey? A calf-milk replacer is based primarily on whey with added protein and fat. Recent advances in the molasses supplement field has made it possible to make a stable fat emulsion.

Using this technology a series of five 4 kilo preps (numbered #6 through #10) were made varying the amount of water in each. The protein source was 80% meat solubles and the fat source was a fancy bleachable tallow.

Five preparations were made with ingredient percentages as shown in Table II utilizing the technique developed in the molasses supplement technology.

25 Milliliters of each sample was placed on 23° C. stability for 1 month. The remainder was packaged and sent to Wisconsin for a trial on young calves. A small portion of No. 3 was tested for stability of the whey, meat solubles, fat emulsion upon dilution.

TABLE II

| Ingredient | Weight of Component in Gms | | | | |
|---|---|---|---|---|---|
| | #6 | #7 | #8 | #9 | #10 |
| Spray dried whey | 1300 | | | | |
| Meat solubles | 400 | | | | |
| Tallow | 300 | | | | |
| Fat stabilizer | 10 | Same for all samples #7–#10 | | | |
| Orthophosphoric acid | 70 | | | | |
| Benzoic acid | 4 | | | | |
| Water | 2500 | 2200 | 2200 | 1750 | 1500 |
| Total weight | 4584 | 4284 | 4084 | 3884 | 3584 |
| % of water | 54.5 | 51.5 | 49.0 | 45.6 | 41.9 |
| Final pH | 3.8 | 3.8 | 3.9 | 3.9 | 3.8 |

Results:

(1) All five samples did not spoil after one month.

(2) No sign of phase breaking of the emulsion.

(3) Calves ate the emulsion readily.

(4) The fat breaks out with dilution on this preparation

In the above and subsequent trials the whey used was made up by reconstituting spray dried whey. This was done to insure a sizeable bacteria colony in the prep. If freshly pasteurized concentrated whey had been used, the data would not be conclusive as to whether the bacteriostate is working.

EXAMPLE 3

In this third Example several changes were made:

(1) a BHA (butylated hydroxy anisole) and BHT (butylated hydroxy toluene) stabilized lard was substituted for bleachable tallow.

(2) An emulsifying agent was added to the system to see if the emulsion will stand dilution with water.

(3) In one of the two samples Oscar Mayer's peptone was substituted for meat solubles as the protein source.

25 mls of Samples #11 and #12 were placed on stability at 23° C. 400 mls of Sample #11 were removed for the emulsion testing. The remainder was sent to Wisconsin for calf testing.

Two preparations were made utilizing the formula shown in Table III.

TABLE III

| Ingredient | Weights Given in Grams | |
|---|---|---|
| | Sample #11 | Sample #12 |
| Whey | 1300 | 1600 |
| Lard | 280 | — |
| Fat emulsifier | 20 | — |
| Fat stabilizer | 10 | — |
| Peptone | 400 | — |
| Meat solubles | — | 400 |
| Orthophosphoric acid, aqueous, 75 weight-% | 90 | 75 |
| Sodium benzoate | 4 | 4 |
| Water | 2000 | 2000 |
| Total weight | 4104 | 4079 |
| % water (by weight) | 48.7 | 49.0 |
| pH | 3.9 | 4.0 |

Results:

(1) Both samples were bacteriostatic for 30 days.

(2) No sign of phase separation upon standing for 30 days. Microscopic examination of fat globules in #11 showed no sign of agglutination (the precursor to phase separation).

(3) When two volumes of warm water were added to 100 gms. of #11 the fat remained emulsified. This was performed four times. The diluted samples were allowed to stand at 23° C. for 3 days and the diluted samples had not yet spoiled.

(4) Samples submitted for calf feeding were readily consumed by the calves.

What is claimed is:

1. An aqueous liquid whey product substantially resistant to the putrefying action of putrefying microorganisms, said whey product comprising:

(a) a whey concentrate having an initial pH in excess of 4.2, said whey concentrate comprising 10 to 65% by weight of whey solids distributed through an aqueous phase, a portion of said whey solids including lactic acid;

(b) 0.01 to 5% by weight, based on the weight of total solids in said whey product, of a preservative agent comprising at least one substantially non-toxic carboxylic acid or substantially non-toxic salt thereof, said carboxylic acid being selected from the group consisting of solid, unsaturated aliphatic carboxylic acid and aromatic carboxylic acid;

(c) in combination with said preservative agent, an amount of acid added to said aqueous phase of said concentrate to downwardly adjust the said initial pH to the pH range of 2.5 to 4.2, said acid being different from the preservative agent and said amount of acid being in addition to the lactic acid included in said whey solids; said combination imparting to said aqueous liquid whey product a substantial resistance to the putrefying action of putrefying microorganisms at various temperatures including 5°, 23°, and 37° C.

2. A whey product according to claim 1 comprising about 35 to 80% by weight of an aqueous phase, wherein said whey solids, said preservative agent, and said acid are uniformly distributed throughout said aqueous phase; said acid being phosphoric acid.

3. A whey product according to claim 2 wherein said phosphoric acid is orthophosphoric acid, and said carboxylic acid is an acid of the formula RCOOH, wherein R is selected from the group consisting of phenyl and hexadienyl.

4. A whey product according to claim 2 wherein the amount of said whey solids is about 30 to 60% by weight, the amount of said preservative agent is about 0.05 to 0.5% by weight, and said pH is at least about 3.0 but less than about 4.2.

5. A whey product according to claim 2 wherein said preservative agent and said phosphoric acid are dissolved in said aqueous phase.

6. A whey product according to claim 1 comprising:

(a) about 30 to 60% by weight of whey solids distributed uniformly throughout about 40 to 70% of aqueous phase;

(b) sufficient orthophosphoric acid, dissolved in said aqueous phase, to provide a substantially stable pH within the range of about 3.0 to 4.2;

(c) more than 0.1% but less than 2.5% by weight, based on the weight of total solids in said whey product, of a preservative agent comprising at least one compound of the formula $(RCOO^-)_m M^{+m}$ wherein R is selected from the group consisting of phenyl and hexadienyl, $M^{+m}$ is a biologically acceptable cation, and $m$ is the valence of M, said preservative agent being uniformly distributed throughout said aqueous phase.

7. A whey product according to claim 6, said whey product having a pH of about 3.8 to 4.0 and wherein said preservative agent comprises, by weight, 25 to 100% benzoic acid or sodium benzoate and 0 to 75% sorbic acid or sodium sorbate.

8. A whey product according to claim 7 wherein the amount of said preservative agent is less than 0.3%.

9. An aqueous liquid whey product according to claim 1, wherein:

said whey concentrate, prior to the addition of said preservative agent and said acid, contains a microorganism colony, which colony will grow to a microorganism content in excess of 125,000 after less than 2 weeks of storage at 23° C., absent any preservation treatment; said whey concentrate, when combined with the said preservative agent and said acid, becomes resistant to the putrefying action of putrefying microorganisms and maintaining a microorganism count below 125,000 for at least one month at temperatures from 5° to 37° C.

10. An aqueous liquid whey product according to claim 1 wherein said product consists essentially of said whey concentrate, said percent of preservative agent, and said amount of acid.

11. A ruminant feed comprising:

(a) a first feed material, said material being substantially resistant to the putrefying action of putrefying microorganisms and being an aqueous liquid whey consisting essentially of:
  (1) a whey concentrate having an initial pH in excess of 4.2, said whey concentrate comprising 10 to 65% by weight of whey solids distributed through an aqueous phase, a portion of said whey solids including lactic acid;
  (2) 0.01 to 5% by weight, based on the weight of the total solids in said whey product, of a preservative agent comprising at least one substantially non-toxic carboxylic acid or substantially non-toxic salt thereof, said carboxylic acid being selected from the group consisting of solid, unsaturated aliphatic carboxylic acid and aromatic carboxylic acid;
  (3) in combination with said preservative agent, an amount of acid added to said aqueous phase of said concentrate to downwardly adjust the said initial pH to the pH range of 2.5 to 4.2, said acid being different from the preservative agent and the amount of acid being in addition to the lactic acid included in said whey solids;
(b) a second feed material, in addition to said aqueous liquid whey product.

12. A ruminant feed according to claim 11, wherein said second feed material comprises a carbohydrate, fat, and protein-containing liquid nutrient medium.

13. A method of feeding animals comprising the step of feeding to said animals the following milk replacer:
(a) a first liquid feed material consisting essentially of:
  (1) a whey concentrate having an initial pH in excess of 4.2, said whey concentrate comprising 10 to 65% by weight of whey solids distributed through an aqueous phase, a portion of said whey solids including lactic acid;
  (2) 0.01 to 5% by weight, based on the weight of total solids in said whey product, of a preservative agent comprising at least one substantially non-toxic carboxylic acid or substantially non-toxic salt thereof, said carboxylic acid being selected from the group consisting of solid, unsaturated aliphatic carboxylic acid and aromatic carboxylic acid;
  (3) in combination with said preservative agent, an amount of acid added to said aqueous phase of said concentrate to downwardly adjust the said initial pH to the pH range of 2.5 to 4.2, said acid being different from the preservative agent and the amount of said acid being in addition to the lactic acid included in said whey solids; and
(b) a second feed material blended with said first feed material, said second feed material being selected from the group consisting of a carbohydrate, a fat, a protein-containing nutrient medium, and mixtures thereof.

14. A method of protecting whey against the putrefying action of putrefying microorganisms comprising the steps of:
(a) concentrating whey containing up to about 7% solids to 10 to 65% by weight of solids, the balance of the resulting whey concentrate being the remaining aqueous phase, said resulting whey concentrate having a pH of more than 4.2;
(b) adjusting the pH of the whey concentrate to less than 4.2 but more than 2.5, through the addition of acid to the said aqueous phase;
(c) adding to said aqueous phase 0.01 to 5% by weight of a preservative agent comprising at least one carboxylic acid or substantially non-toxic salt thereof, said carboxylic acid being selected from the group consisting of solid, unsaturated aliphatic carboxylic acid and aromatic carboxylic acid.

15. A method according to claim 14 wherein said whey concentrate, prior to carrying out steps (b) and (c), contains a microorganism colony, which colony can grow to a microorganism content in excess of 125,000 in less than 2 weeks of storage at 23° C.; said whey concentrate, after carrying out steps (b) and (c), being resistant to the putrefying action of putrefying microorganisms and maintaining a microorganism count substantially below 125,000 for at least 5 weeks at temperatures from 5° to 37° C.

* * * * *

UNITED STATES PATENT AND TRADEMARK OFFICE
CERTIFICATE OF CORRECTION

PATENT NO. : 4,081,555

DATED : March 28, 1978

INVENTOR(S) : James W. Sawhill

It is certified that error appears in the above-identified patent and that said Letters Patent are hereby corrected as shown below:

In column 4, line 19, delete "of".
In column 6, line 50, under the headings "#7" through "#10", insert --Same for all samples #7-#10--.
In column 6, line 51, under the headings "#7" through "#10", delete "Same for all samples #7-#10".
In column 7, line 2, for "bacteriostate" read --bacteriostat--.
In column 8, line 38, delete "m is".
In column 8, line 39, prior to "the valence of M", insert --m is--.

Signed and Sealed this

Seventeenth Day of October 1978

[SEAL]

Attest:

RUTH C. MASON
*Attesting Officer*

DONALD W. BANNER
*Commissioner of Patents and Trademarks*